United States Patent [19]

Kumagai et al.

[11] Patent Number: 4,743,372

[45] Date of Patent: May 10, 1988

[54] ULTRAFILTRATION MEMBRANE CARTRIDGE SEPARATION SYSTEM

[75] Inventors: Masahiko Kumagai, Ebina; Takeshi Yokomizo, Yokohama, both of Japan

[73] Assignee: Sanki Engineering Co., Ltd. 4-1, Tokyo, Japan

[21] Appl. No.: 842,917

[22] Filed: Mar. 24, 1986

[30] Foreign Application Priority Data

Mar. 26, 1985 [JP] Japan .................................. 60-059581

[51] Int. Cl.4 ........................ B01D 13/00; B01D 27/08
[52] U.S. Cl. ................................. 210/195.2; 210/232;
210/321.6; 210/323.2; 210/335; 210/345;
210/416.1
[58] Field of Search ............... 210/195.2, 323.2, 433.2,
210/416.1, 456, 232, 321.6, 335, 340, 345

[56] References Cited

U.S. PATENT DOCUMENTS

| 3,494,465 | 1/1970 | Nyrop ................................. 210/194 |
| 3,893,920 | 7/1975 | Hubbard et al. ..................... 210/197 |
| 3,984,319 | 10/1976 | Hubbard et al. ..................... 210/136 |
| 4,435,289 | 3/1984 | Breslau ............................ 210/433.2 |
| 4,501,663 | 2/1985 | Merrill ............................ 210/433.2 |
| 4,601,824 | 7/1986 | Dreyer .............................. 210/456 |

FOREIGN PATENT DOCUMENTS 2808022 8/1979 Fed. Rep. of Germany ... 210/195.2

Primary Examiner—Richard V. Fisher
Assistant Examiner—W. Gary Jones
Attorney, Agent, or Firm—Holman & Stern

[57] ABSTRACT

An ultrafiltration system includes radially disposed housings for ultrafiltration cartridges, the housing being outwardly connected to ducts which communicate with a pump in the housing. The housings are radially disposed, to permit a relative reduction in height of the cartridges relative to the pump height level.

6 Claims, 3 Drawing Sheets

ULTRAFILTRATION MEMBRANE CARTRIDGE SEPARATION SYSTEM

BACKGROUND OF THE INVENTION

1. Field of the Invention

The present invention relates to new and useful improvements in semi-permeable membrane separation equipment for an ultrafiltration system, and more particularly to such an equipment in which casings for receiving ultrafiltration membrane cartridges are provided as separate units with respect to a vertical casing which receives a submerged axial-flow pump, so as to be radially arranged around the outside of the vertical casing so that the equipment has a star-like shape in its plan view.

2. Description of the Prior Art

As described in U.S. Pat. Nos. 3,893,920 and 3,984,319, in a conventional type of an ultrafiltration system hitherto employed widely, a plurality of ultrafiltration membrane cartridges are detachably mounted on an inner surface of each of the sidewalls of a single canister which has a large-sized common casing having a square shape in transverse cross-section. In such a conventional system, as shown in FIGS. 6 and 7 of the accompanying drawings, a plurality of ultrafiltration membrane cartridges 50 one unit of which is shown in FIG. 5 are mounted on the inner surface of each of the sidewalls 4a of a large-sized outer casing 4 having a square shape in transverse cross-section, so as to form four adjacent columns as shown in FIG. 7, each of which columns consists of three stacked units as shown in FIG. 6. In a central portion of the interior of the outer casing 4, there is provided a vertical pump casing 2 having both of its upper and lower end portions open, in which pump casing 2 an axial-flow pump 1 comprising an impeller 3 is disposed. The pump 1 is driven by a drive means or drive motor 7 which is provided in either an upper portion or a lower portion of the outer casing 4 so as to feed carrier water into the ultrafiltration membrane cartridges 50. Incidentally, the reference numeral 6 designates a frame for supporting the casing 4.

As described above, when the drive means for the impellar 3 of the axial-flow pump 1 is installed in the upper portion of the outer casing 4 of the conventional ultrafiltration system, there is a problem in the case of installation in a basement with restricted height, because the overall height of the system is too great. On the other hand, when the drive means is installed in the lower portion of the casing 4, the drive means is disposed outside the casing 4 in a horizontally projecting manner so as to increase the floor space required beyond that of the main casing 4. In addition such an arrangement of the drive means in the lower portion of the casing 4 is less effective in reducing the overall height of the system because of the necessity of providing a bearing mechanism for the impeller 3, which bearing mechanism must be provided in a lower portion of the vertical pump casing 2.

A conventional ultrafiltration system having the above construction is also disadvantageous in that the installation and maintenance of such drive means are difficult, and a further disadvantage arises from the noise and vibrations caused during operation in both the upper and lower flow regions of the main casing 4, in which regions the flow path for the incoming water is changed from a square to a circle or vice versa in transverse cross-section creating a turbulent flow which generates such noise and vibrations.

In addition, the conventional ultrafiltration system also has the following problems which affect the system's perfomance. In the conventional system, since it is not possible sufficiently to increase the height of the main casing 4 which receives the ultrafiltration membrane cartridges 50 due to the installation of the drive means, it is substantially not possible to stack the cartriges more than three units high. Consequently, in order to achieve a required perfomance level, it is necessary to increase the number of adjacent columns of the stacked cartridges 50. However, such an increase in the number of the adjacent columns requires an increased width of the sidewall 4a of the casing 4, which leads to a larger overall size of the system making it impossible to reduce the size of the system. For the above reasons, the conventional system employs an arrangement of the cartridges 50 in four adjacent columns at each side each of which columns contains three stacked units as shown in FIGS. 6 and 7, and still suffers from much difficulty in transportation and installation of the system due to its large size. The conventional system is further disadvantageous in that there is wasted space in the region in which the ultrafiltration membrane cartridges 50 are mounted on the inner surface of each of the sidewalls 4a of main casing 4. Further, as described above, since the conventional system has a relatively large number of columns of stacked cartridges 50 mounted on the inner surface of each of the sidewalls 4a of the casing 4, the cross-sectional area of the flow path of the raw water passing through the cartridges 50 is large resulting in high power consumption. This is yet another disadvantage inherent in the conventional system.

SUMMARY OF THE INVENTION

It is an object of the present invention to provide a novel casing for receiving the ultrafiltration membrane cartridges, which casing has a star-like shape in its plan view.

It is another object of the present invention to avoid or minimize one or more of the above disadvantages and problems inherent in the conventional system.

The present invention provides an ultrafiltration system having a circulation means comprising a submerged axial-flow pump, for circulating raw water supplied to the system, which is received in a single vertical pump casing together with a driving means therefor, while a plurality of cartridge casings for receiving the cartridges are radially provided around an outer periphery of the vertical pump casing as separate pieces with respect to the pump casing so as to take a star-like arrangement in their plan view, which cartridge casings are connected to the pump casing through upper and lower curved conduits which extend from upper and lower end portions of the pump casing, respectively. Further, in the system of the present invention, an openable cover is mounted on each of the cartridge casings to enable the ultrafiltration membrane cartridges to be detachably mounted in the cartridge casings, through which ultrafiltration membrane cartridges the water passes in a reversible manner.

With an ultrafiltration system of the present invention the water to be treated, which has been introduced into the pump casing housing a circulation means such as a submerged axial-flow pump, flows upwardly through the pump casing when the impeller is rotatably driven by drive means such as a drive motor, and then passes into the cartridge housings via the upper end region of the pump casing and the upper conduits, and then passes back into the lower end region of the pump casing via the lower conduits thereby circulating through the system. When the thus circulated water passes downwardly through the interior of the ultrafiltration membrane cartridges mounted in the cartridge housings, foreign matter suspended in the water is separated from the water by the cartridges in an absorbing filtration manner so as to produce an ultrafiltrate which is then removed from the ultrafiltration system. When the ultrafiltration membrane cartridges become clogged, the suction/filtration mode of operation of the system is halted and the circulation means is then driven in the reverse direction to cause a large volume of the untreated water to flow upwardly through the ultrafiltration membrane cartridges thereby to clear the ultrafiltration membranes.

In the system of the present invention, the drive means e.g. drive motor for driving the impeller, is installed in the vertical pump casing together with circulation means such as a pump thereby making it possible to reduce the overall height of the system, and also to reduce noise and vibrations in operation by avoiding creation of turbulent flow leading to such noise and vibrations. This is achieved in both the upper and lower flow regions of the vertical pump casing by providing a flowing path for the water being treated which changes smoothly from a large diameter circle to a small diameter circle or vice versa in transverse cross-section in contrast to the flow path in the conventional system.

Further, although the overall height of the system of the present invention is less than that of the conventional ultrafiltration system, the system of the present invention enables the height of the main filter body portion, i.e. the height of the cartridge housing to increase, at the same time thereby making it possible to increase the number of ultrafiltration membrane cartridges stacked in the cartridge housing. As a result, if the same number of ultrafiltration cartridges is employed, it is possible to reduce the number of the adjacent columns of the stacked ultrafiltration cartridges thereby reducing the cross sectional area of the flow path of the water being treated, thereby saving energy. In other words, since it is possible to increase the effective height of the cartridge casing, the cross sectional area of the flow path through the ultrafiltration cartridges can be generally reduced for a given number of ultrafiltration cartridges thereby allowing the same performance to be achieved as with the conventional system. This leads to the energy saving mentioned above.

Further, with the present invention, it is possible to divide the cartridge housing for the ultrafiltration membrane cartridges, into a plurality of smaller-sized sub-housings which make manufacture of the system easier and more accurate.

Furthermore, according to the present invention, since the pump casing and the cartridge housings are formed separately from each other, it is possible to eliminate wasted space in the housings in contrast with the single large-sized square-shaped conventional form of casing which houses both the pump casing and the cartridge housings therein. In addition the system of the present invention is also advantageous in its easy transportation, easy installation and easy maintenance.

BRIEF DESCRIPTION OF THE DRAWINGS

FIGS. 1 to 4 show an embodiment of the present invention wherein:

FIG. 1 is a front elevation view of an ultrafiltration system of the invention shown in longitudinal cross-section in its right half;

FIG. 2 is a detail front elevational view of one cartridge housing and the associated upper and lower conduits;

FIG. 3 is a top plan view of the system of FIG. 1;

FIG. 4 is a horizontal cross-sectional view taken along the line IV—IV in FIG. 1.

FIGS. 6 and 7 show a known system wherein:

FIG. 6 is a schematic longitudinal cross-sectional view of the main part with an alternate drive and pump means shown in phantom line; and FIG. 7 is a horizontal cross-section taken along the line VII—VII in FIG. 6.

DESCRIPTION OF THE PREFERRED EMBODIMENT

Further preferred features and advantages of the present invention will appear from the following detailed description given by way of example of a preferred embodiment illustrated with reference to the accompanying drawings.

Figure 1:
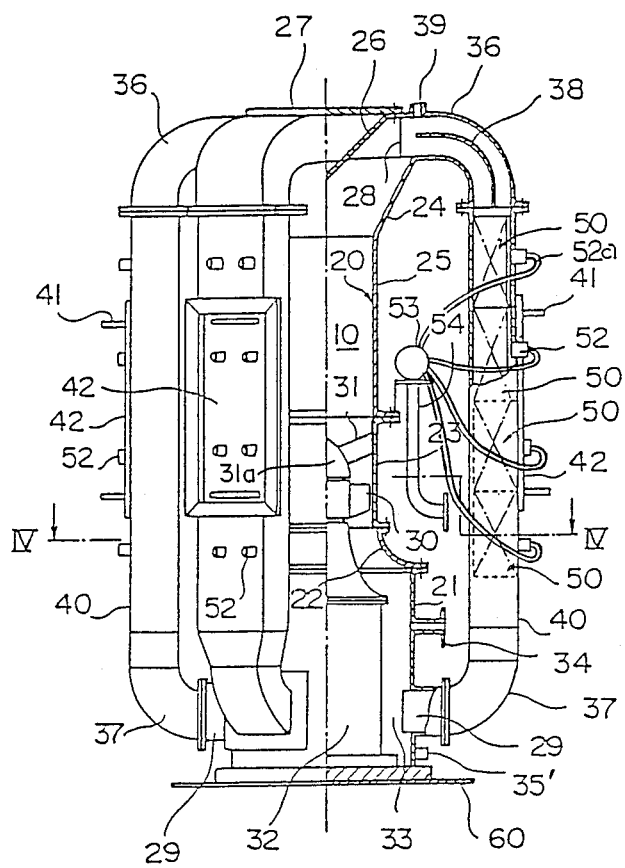
Figure 2:
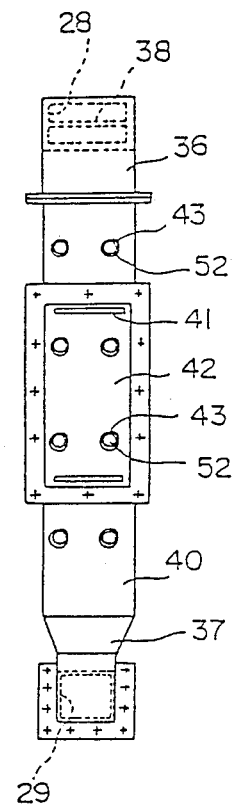
Figure 3:
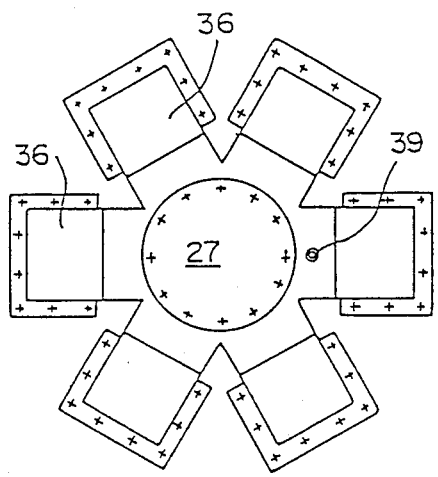

FIG. 1 shows a system of the present invention, having a submerged axial-flow pump 10 of well known type and mounted on a horizontal base plate 60 in an upright position, with an impeller 30. The submerged axial-flow pump 10 is shown as one example of a suitable circulation means for the system of the present invention, but may of course be substituted by other types of pump. The submerged axial-flow pump 10 is housed in a cylindrical vertical pump casing 20 in which a drive means, for example a reversible electric motor 32 is provided for driving of the pump 10.

The vertical pump casing 20 is constructed as a pair of vertically divided parts having the same diameter i.e. middle and upper casings 23 and 25, the middle one 23 being connected to a large diameter lower casing 21 through a funnel-like casing 22 which serves to reduce the cross-sectional diameter of the flow path of the water being treated, which lower casing 21 is mounted on the horizontal base plate 60 in an upright position. An upper end portion of the upper casing 25 forms a funnel-like portion 24 which serves to increase the cross-sectional diameter of the flow path so as to expand the flow path in the upward direction. On an upper end opening portion of the funnel-like portion 24, there is mounted a cover 27 in a lower surface of which is provided a cone 26 which serves to divert the water flow, while in a peripheral wall of the upper end portion of the funnel-like portion 24 there are provided a plurality of circumferentially spaced rectangular coupling-openings 28.

In a lower end portion of the lower casing 21, there are provided a plurality of correspondingly disposed radially extending rectangular coupling-openings 29 below respective rectangular coupling-openings 28 at the upper end portion of the upper casing 25.

At an upper part of the interior of the middle casing 23, there are mounted a top portron 31a of pump 10 and a flow-control plate 31 which also acts as a support for the top portion 31a a which serves to hold an upper end of a rotary shaft of the pump 10. Below these portions, the impeller 30 is disposed. The drive motor 32 is provided on the horizontal base plate 60 in the lower casing 21 so as to drive the impeller 30 which is disposed above the motor 32. Between the lower casing 21, funnel-like casing 22 and motor 32, there is defined a flow path 33 which communicates with the interior of the middle casing 23.

Incidentally, in an alternative form of construction to that shown in the drawings, it is possible to dispose the impeller 30 below the motor 32, change the positions of the top portion 31a and flow-control plate 31, and further to change the shape of the pump casing 20.

In the upper end portion of the lower casing 21, there are mounted an inlet pipe 34 for the water to be treated, and an overflow-pipe 35. In the lower end portion of the lower casing 21, there is mounted a drain pipe 35. An upper conduit 36, which has its front end portion cranked downwardly and has a rectangular shape in transverse cross-section, is connected to each of the rectangular coupling-openings 28 in the peripheral wall of the upper end portion of the upper casing 25, so as to radially extend therefrom. Below each upper conduit 36, a lower conduit 37 has its front end portion cranked upwardly and has a rectangular shape in transverse cross-section, and extending radially from the lower end portion of the lower casing 21 to which it is connected. Incidentally, inside the upper conduit 36 there is mounted a guide plate 38 for the untreated water, whilst in an upper wall of any of the upper conduits 36 there is provided a ventilation hole 39. Between the downward openings of the upper conduits 36 and the upward openings of the corresponding lower conduits 37, there are connected a plurality of cartridge housings 40 having similar rectangular transverse cross-sectional shapes. In other words, an upper and lower end of each of the cartridge housings 40 are connected to the upper and lower end portions of the vertical pump casing 20 through the upper and lower conduits 36, 37, respectively.

Figure 5:
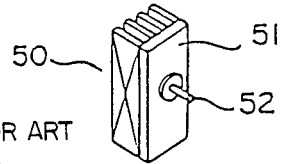
FIG. 5 is a perspective view of an individual ultrafiltration membrane cartridge.

To a side wall of each of the cartridge housings 40, there is fitted an opening cover or hatch 42 which has a handle 41 and is positioned in a suitable part of the cartridge housing 40. Inside this housing 40, there are received the ultrafiltration membrane cartridges 50 which are shown in FIG. 5 and are well known, per se so as to form six packages of cartridges 50 around the pump casing 20, each of which packages comprises two adjacent parallel columns of stacked cartridges 50, each of which columns comprises four stacked cartridges 50.

Each of the ultrafiltration membrane cartridges 50 is provided with a header plate 51 which is provided with a suction connector 52 which is inserted into a connector mounting opening 43 and mounted therein, which opening 43 is disposed in the wall of the cartridge housing 40 or the cover 42. Incidentally, these suction connectors 52 are connected to a header pipe 53 through suction tubes 52a so that the thus obtained ultrafiltrate can be taken out through a discharge pipe 54 which is connected to the header pipe 53.

The opening cover 42 enables the ultrafiltration membrane cartridges 50 to be readily installed, removed and inspected as required for maintenance purposes.

In operation, the above-described ultrafiltration system is connected to an untreated water tank or submerged in the untreated water tank, so that the untreated water is introduced into the interior of the vertical pump casing 20 through the untreated water feed pipe 34. Under such circumstances, when the impeller 30 is driven by the drive motor 32, the untreated water which has been introduced in the vertical pump casing 20 is driven upwardly through the middle casing 23 and the upper casing 25 after passing through the guide vane 31, and thereafter radially dispersed by the funnel-like portion 24 and the cone 26 which serves to disperse the untreated water. Then, the water passes through the coupling-openings 28, upper conduits 36, cartridge housings 40, lower conduits 37 and coupling-openings 29 so that the water is circulated to the lower casing 21 of the vertical pump casing 20. The flow of circulating water is controlled by the guide plates 38 in the upper conduits 36 and flows downwardly into the cartridge housings, so that the water is sucked through and filtered as it passes downwardly through the ultrafiltration membrane cartridges 50 which are mounted in the housing 40. The thus filtered ultrafiltrate is collected into the header pipe 53 through the headers 51 of the ultrafiltration membrane cartridges 50, suction fittings 52, and suction pipes 52a, and then taken out of the ultrafiltration system through a processed water discharging pipe 54 as treated or processed water.

Figure 4:
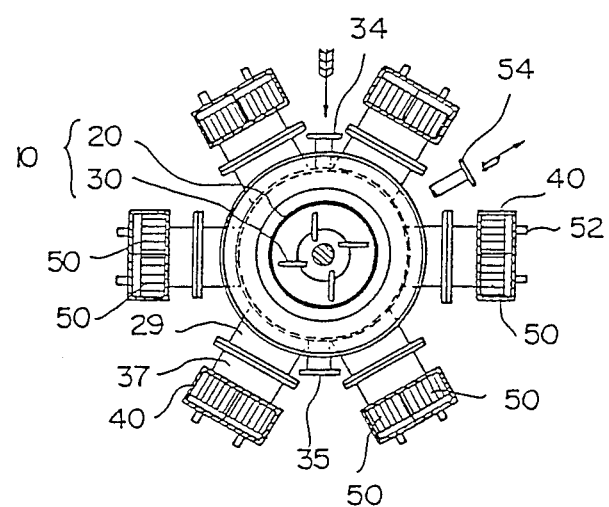
Figure 6:
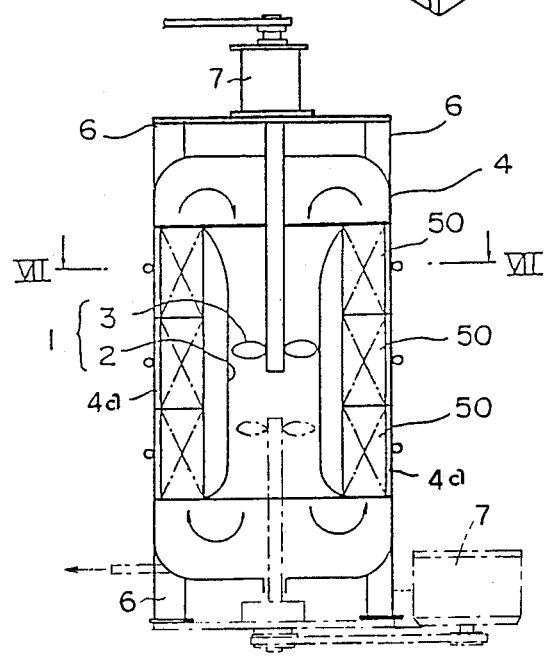
Figure 7:
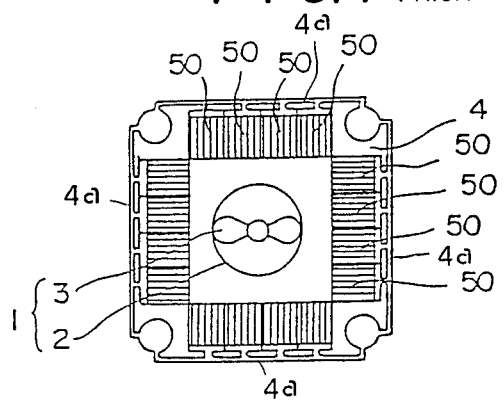

When the ultrafiltration system of the present invention becomes clogged, the normal suction/filtration operation of the system is stopped, and the motor 32 is then driven in a reverse direction to cause a large amount of untreated water to flow upwardly through the ultrafiltration membrane cartridges 50 so that cleaning of the ultrafiltration membranes is performed. Further, since the motor 32, which drives the impeller 30, is mounted on the horizontal base plate 60 in the lower casing 21 of the vertical pump casing 20, it is possible to reduce the overall height of the system relative to that of the conventional ultrafiltration system, and it is also possible to simplify the installation of the motor, and also to reduce noise and vibrations during operation of the system. Further, although the overall height of the system of the present invention is less than that of the conventional ultrafiltration sytem, the system of the present invention enables the height of the cartridge housing 40, i.e. the effective height of the stacked cartridge 50 in the cartridge housing 40 to increase. Consequently, for a given number, for example 48, of ultrafiltration membrane cartridges 50, the conventional system has four packages each of which comprises four columns each of which comprises three stacked cartridges 50 as shown in FIGS. 6 and 7 so as to form a flow path across 16 columns, whilst the system of the present invention has six packages each of which comprises two columns each containing four stacked cartridges 50 as shown in FIGS. 1 and 4 so as to form a flow path across 12 columns which is significantly less than that of the conventional system whereby the system of the present invention enables energy to be saved through a reduced operating power requirement. Since each of the cartridge housings 40, in which the ultrafiltration membrane cartridges 50 are mounted, is a separate small-sized unit of relatively simple construction, its manufacture is relatively easy and more accurate, and it is possible to minimize wasted space in the area of the ultrafiltration membrane cartridges and the cartridge housings 40, and its transportation and installation are also facilitated. In addition to the above advantages, a further advantage is that the ultrafiltration membrane cartridges 50 are easily mounted, easily removed and easily inspected during their maintenance. Incidentally, a comparison of the relative power consumption rates of the ultrafiltration system of the present invention shown in FIGS. 1 to 4 and the conventional ultrafiltration system shown in FIGS. 6 and 7 shows that the power consumption of the ultrafiltration system of the present invention is only 7.5 Kw, as compared with 11 kw for the conventional ultrafiltration system.

We claim:

1. An ultrafiltration system using membrane cartridges comprising:
    a vertical water pump casing defining a flow path for water therethrough and having upper and lower end portions;
    inlet and outlet means for water in said pump casing;
    a submersible axial-flow pump mounted in said casing comprising a pump motor and an impeller connected to said motor for being rotatably driven by said motor to pump water through said casing;
    a plurality of separate upper fluid flow conduits having uper portions substantially radially extending from and connected in fluid flow relationship with said upper end portion of said casing and downwardly extending distal end portions;
    a corresponding plurality of separate lower fluid flow conduits having lower portions substantially radially extending from and connected in fluid flow relationship with said lower end portion of said casing and upwardly extending distal end portions;
    a plurality of separate filtration cartridge housings spaced radially outwardly with respect to said pump casing and spaced with respect to each other, each housing being hollow and having opposite ends connected respectively in fluid flow relationship with said distal ends of said fluid flow conduit and corresponding lower fluid flow conduits, so that said casing, upper and lower fluid flow conduit and cartridge housings comprise a plurality of separate fluid flow circuits for water pumped by said pump;
    hatch means on each cartridge housing for providing access to the interior of each housing and for passing filtration cartridges therethrough; and
    at least one box-shaped ultrafiltration cartridge detachably mounted in the hollow interior of at least one of said cartridge housings for filtering water flowing through said at least one cartridge housing.

2. An ultrafiltration system as claimed in claim 1 and further comprising:
    a plurality of said box-shaped cartridges detachably mounted in at least one of said cartridge housings;
    a suction connector on each cartridge;
    a suction connector mounting opening for each cartridge in said at least one cartridge housing and the respective hatch means thereof;
    suction means for said system; and
    a plurality of suction conduits each having one end connected in fluid flow relationship with a respective suction connection and another end connected in fluid flow relationship with said suction means, so that operation of said suction means draws ultrafiltrate from said cartridges.

3. An ultrafiltration system as claimed in claim 1 and further comprising:
    flow-guiding plates mounted in said upper fluid flow conduits and extending substantially parallel to the direction in which said conduits extend for guiding the flow of water therethrough.

4. An ultrafiltration system as claimed in claim 1 wherein:
    said at least one box-shaped ultrafiltration cartridge comprises a plurality of said cartridges stacked on top of each other to form at least one column of cartridge in each housing.

5. An ultrafiltration system as claimed in claim 4 wherein:
    said at least one column of cartridges comprises two columns having four stacked cartridges in each column.

6. An ultrafiltration system as claimed in claim 1 wherein:
    said plurality of filtration cartridge housings and upper and lower fluid flow conduits comprise six substantially equiangularly spaced individual sets of upper and lower fluid conduits and cartridge housings.

* * * * *